Sept. 8, 1931.  W. H. SILVER  1,822,711
RIDGE BURSTER
Filed Jan. 28, 1927  2 Sheets-Sheet 1
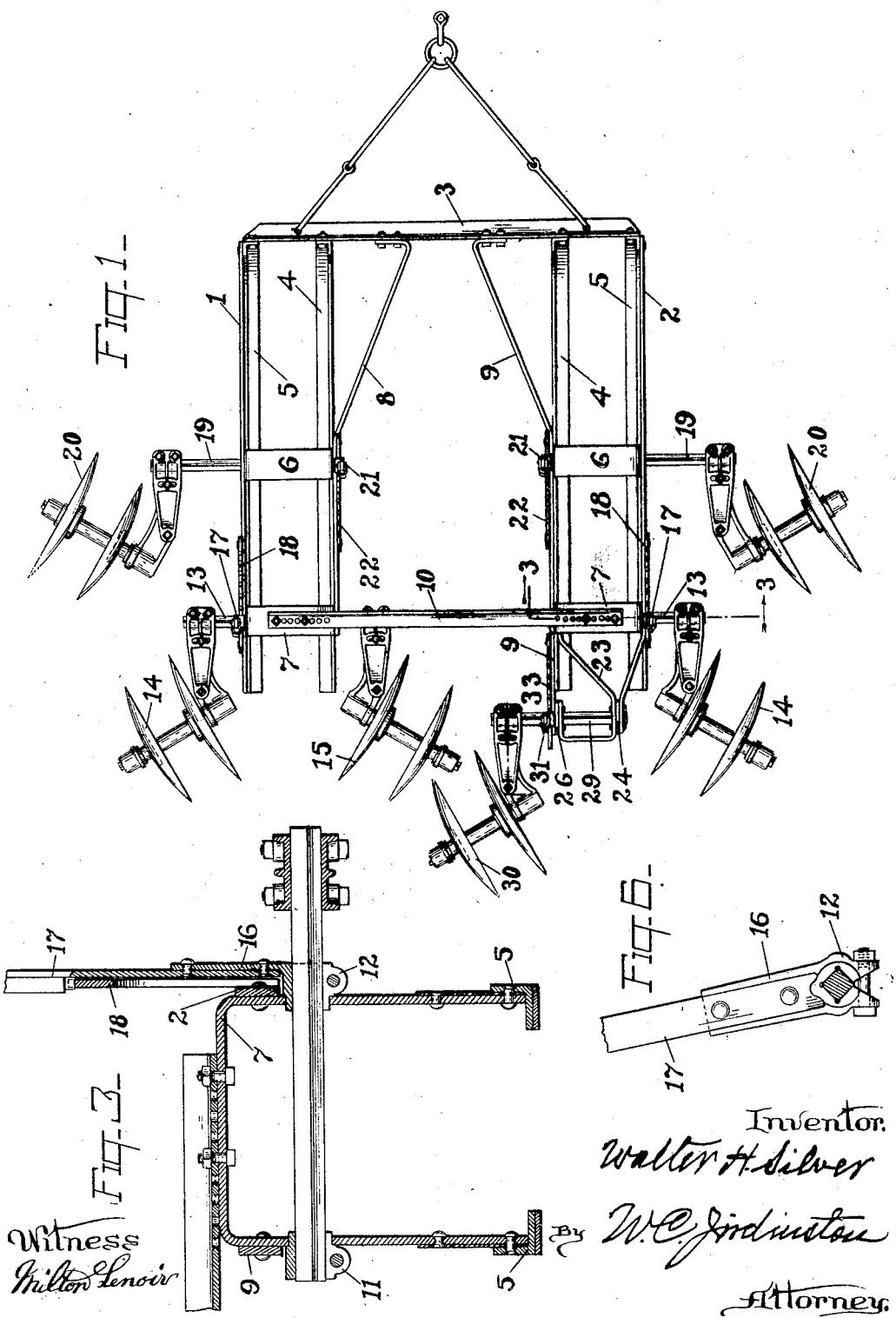
Witness
Milton Lenoir
Inventor.
Walter H. Silver
By W. C. Johnston
Attorney.

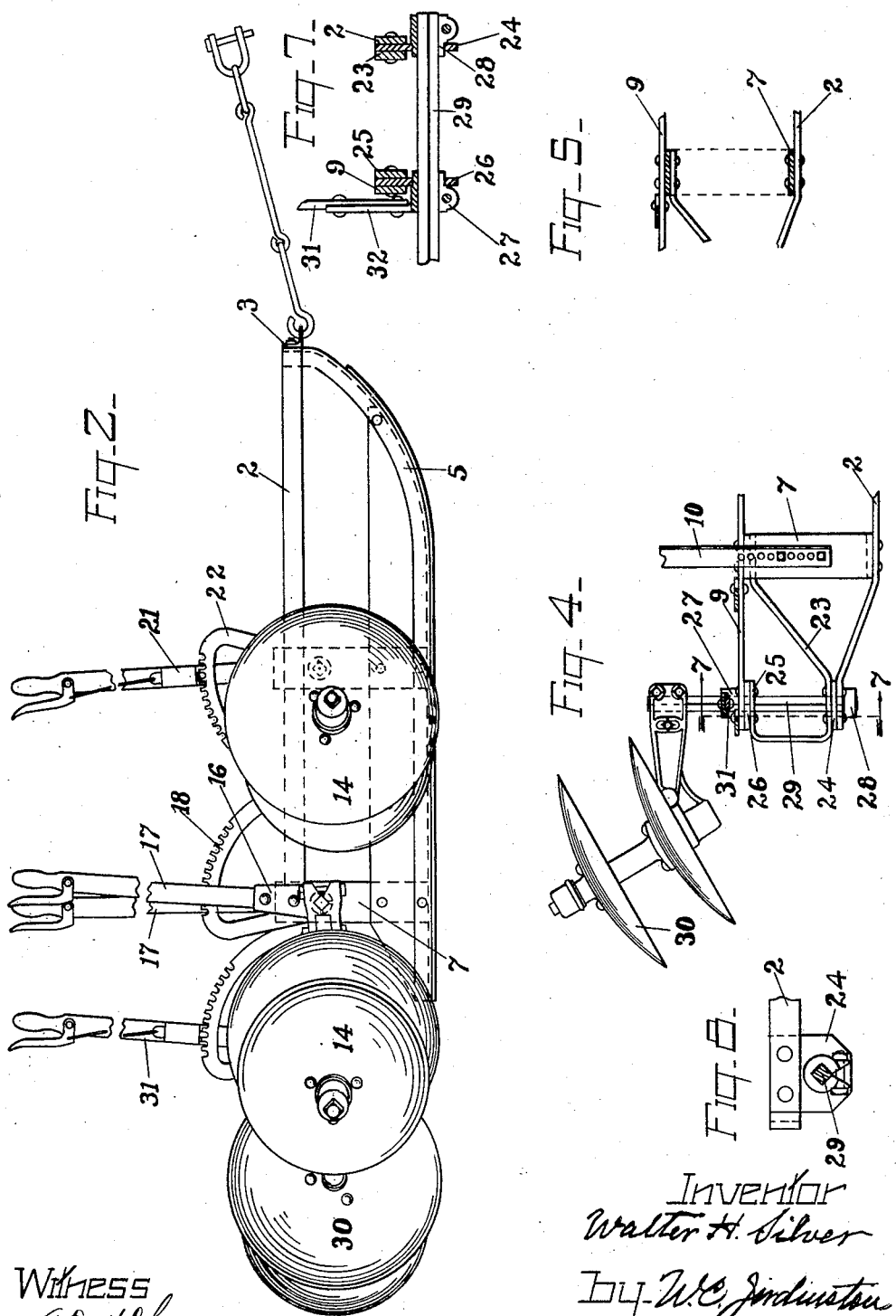

Patented Sept. 8, 1931

1,822,711

UNITED STATES PATENT OFFICE

WALTER H. SILVER, OF MOLINE, ILLINOIS, ASSIGNOR TO DEERE & COMPANY, OF MOLINE, ILLINOIS, A CORPORATION OF ILLINOIS

RIDGE BURSTER

Application filed January 28, 1927. Serial No. 164,338.

My invention relates to that type of cultivators known as ridge bursters, particularly of the three row type, and has for its object the construction and arrangement of parts to produce an equal degree of efficiency in the soil-turning tools employed in the simultaneous destruction of three ridges.

Referring to the drawings in which similar numerals indicate identical parts—

Figure 1 is a plan view of a three row machine embodying my improvements;

Figure 2 is a side elevation of Figure 1;

Figure 3 is an enlarged detail section on the line 3—3 of Figure 1;

Figure 4 is a detail plan of my improvement;

Figure 5 is a constructional detail of part of Figure 4;

Figure 6 is an enlarged detail of a lever mounting;

Figure 7 is a detail section on the line 7—7 of Figure 4, and

Figure 8 is a detail of Figure 4.

The main frame of the machine comprises side bars 1 and 2 bolted to a transverse angle bar 3. At each side of the main frame are sled runners 4 and 5 spaced apart and having their forward ends bent upwardly to the transverse bar 3 and bolted thereto. Each pair of runners is secured to the ends of vertically disposed arches 6 and 7 to which the frame bars 1 and 2 are also bolted or riveted adjacent the tops thereof. The arches 6 are intermediate the ends of the runners, frame bars 8 and 9 are bolted thereto and to the arches 7, and converge forwardly to the transverse bar 3 to which they are rigidly secured. The rear arches 7 are connected by a transverse bar 10. Rotatably mounted in suitable openings in the arches 7 are split bushings 11 and 12 in which are secured shafts 13, square in cross-section, carrying upon their outer ends, respectively, inthrow disk gangs 14, the left shaft 13 also having an outthrow disk gang 15 mounted on its inner end.

Preferably integral with the bushings 12, respectively, are upwardly extending arms 16 to which are riveted levers 17, as fully shown in Figure 3, provided with the usual type of latch to engage with notches in section 18 rigidly mounted on the main frame, the levers 17 being operable to raise or lower the gangs when desired. Shafts 19 are mounted in the arches 6, in a manner similar to the shafts 13, and carry on their outer ends outthrow disk gangs 20, the shafts 19 being rockable by levers 21 mounted in the same way as the levers 17, and provided with latches to engage with notched sectors 22 secured on the main frame.

As shown in Figure 1, the frame bar 2 is extended rearwardly of the arch 7 and is bent inwardly toward a bar 23 having its forward end riveted to the arch 7. The bar 23 is bent to extend rearwardly toward the bar 2, and at their juncture is riveted between them a downwardly extending plate 24. The bar 23 is then bent inwardly parallel to the bar 10. A further bend presents a part 25, parallel to an extension of the bar 9, and between said extension and the part 25 is riveted a plate 26 similar to the plate 24. In suitable openings in the plates 24 and 26 are rotatably journaled split bushings 27 and 28 in which is rigidly mounted a shaft 29, square in crosssection, carrying on its inner end an outthrow gang 30 of disks overlapping the disk gang 15. A lever 31 is secured to an arm 32 on the bushing 27, and has the common type of latch to engage with notches of a sector 33 riveted on the bar 9.

In a three ridge machine, such as I have shown, the sled runners travel in the trenches at the sides of the central ridge, which is operated upon by the disk gangs 15 and 30 to turn over the soil into said trenches, the disk gangs 14 also operating to turn the soil into the same trenches, and the disk gangs 20 turning the soil outwardly into adjacent trenches. The left disk gang 14 and the disk gang 15 are carried by the same shaft 13, consequently both gangs are adjustable up or down to the same degree when the shaft is rotated by the lever 17 attached thereto. It is not practical, however, to so construct the machine that the gang 30 and adjacent gang 14 can be carried on the shaft 13, for if these gangs were carried on the same shaft and the relative position of the gang 30 with the gang 15 be maintained, as is necessary, then rocking the shaft would raise or lower the gang 30 to a greater degree than the adjacent gang 14; consequently, to prevent this serious objection, I extend one side of the main frame rearwardly, as stated, and journal thereon the axle 29, carrying the gang 30, and I provide a lever by the operation of which the gang 30 is raised or lowered independently of the adjacent gang 14.

What I claim is—

1. In a ridge burster, the combination of a frame including side bars and front and rear bars, sled runners supporting the frame on opposite sides thereof, gangs of earth working devices carried on each side of said frame, means on the frame operable to adjust said gangs vertically, a rock shaft journaled on the rear of the frame and transversely thereof, a gang of earth working devices on each end of said shaft, a gang of similar devices on said shaft adjacent the center thereof, means on the frame operable to rock said shaft and vertically adjust the gangs thereon, a rearward extension to one side of said frame, a gang of earth working devices carried by said extension, and means on said extension operable to raise or lower the gang thereon irrespective of the adjustment of the other gangs.

2. In a ridge burster, the combination of a frame including side bars and front and rear bars, sled runners supporting the frame on opposite sides thereof, gangs of vertically adjustable earth working devices carried on each side of the frame, means on the frame operable to adjust said gangs vertically, a rock shaft journaled on the rear of the frame transversely thereof, a gang of earth working devices on each end of said shaft, a gang of similar devices on said shaft adjacent the center thereof, means on the frame operable to rock said shaft and vertically adjust the gangs thereon, a rearward extension to one side of the frame, a rock shaft journaled on said extension, having a gang of earth working devices supported thereon, and means on said extension operable to rock the shaft thereon and vertically adjust the gang on said shaft irrespective of the adjustment of the other gangs.

3. In a ridge burster, the combination of sled runners, vertically disposed arches secured on said runners, a frame mounted on said arches rigidly secured thereon and to the forward ends of said runners, one side of said frame extending rearwardly of the other, gangs of adjustable earth working devices carried on each side of the frame, means operable to adjust said devices, similarly adjustable devices carried on the rear of the frame centrally thereof, one gang of said central devices carried by said frame extension, and means on said extension operable to adjust the earth working devices thereon irrespective of the adjustment of the other devices.

4. In a ridge burster, the combination of two sets of runners spaced apart and having a forward upwardly curved termination, a bar extended transversely of said runners and secured to the forward ends thereof, an arch mounted intermediate the ends of each set of runners, an arch mounted on the rear of each set of runners, frame bars secured to said arches adjacent the tops thereof and to the forward transverse bar, the frame bars at one side of the implement of greater length than the frame bars at the opposite side, shafts rockably journaled in said arches and extending outwardly therefrom, cultivating devices supported on said shafts, and means on the frame operable to rock said shafts and adjust said devices vertically.

5. In a ridge burster, the combination of two sets of runners spaced apart and having a forward upwardly curved termination, a bar extending transversely of said runners and secured to the forward ends thereof, an arch mounted on each set of runners intermediate the ends of the runners, a similar arch mounted on the rear of each set of runners, frame bars secured to said arches adjacent the tops thereof and secured to the forward transverse bar, a rear transverse bar secured to the rear arches, shafts rockably journaled in said arches and extending outwardly therefrom, cultivating devices supported on said shafts, and means on the frame operable to rock said shafts and adjust said devices vertically.

6. In a ridge burster, the combination of two sets of runners spaced apart and having a forward upwardly curved termination, a bar extending transversely of said runners and secured to the forward ends thereof, an arch mounted on each set of runners intermediate the ends of the runners, an arch mounted on the rear of each set of runners, a transverse bar secured to the rear arches, frame bars secured to said arches adjacent the tops thereof and secured to the forward transverse bar, the frame bars at one side of the implement extending rearwardly of the adjacent arch, shafts rockably journaled in said arches, a shaft journaled on said extension, cultivating devices supported on said shafts, and mechanism mounted on the frame operable to rock said shafts and adjust said devices vertically.

WALTER H. SILVER.